United States Patent [19]
Cannon

[11] Patent Number: 5,170,198
[45] Date of Patent: Dec. 8, 1992

[54] CAMERA APPARATUS WITH PSEUDO FORMAT FILM ENCODEMENT

[75] Inventor: James W. Cannon, Penfield, N.Y.

[73] Assignee: Eastman Kodak Company, Rochester, N.Y.

[21] Appl. No.: 708,418

[22] Filed: May 31, 1991

[51] Int. Cl.⁵ .............................................. G03B 17/24
[52] U.S. Cl. .................................................... 354/105
[58] Field of Search .................... 354/105, 195.1, 106

[56] References Cited

U.S. PATENT DOCUMENTS

| | | | |
|---|---|---|---|
| Re. 32,797 | 12/1988 | Haney | 354/481 |
| 3,490,844 | 1/1970 | Sapp | 355/40 |
| 4,357,102 | 11/1982 | Taren et al. | 355/77 |
| 4,975,732 | 12/1990 | Robison et al. | 355/40 |

*Primary Examiner*—Michael L. Gellner

[57] ABSTRACT

Apparatus in a simple low cost camera for encoding the existence of pseudo format image exposures on film having a magnetic layer thereon with prerecorded data in one or more parallel tracks on the film. A user operable means on the camera establishes the existence of a pseudo tele or pseudo pan image frame and actuates one or more permanent magnets into contact with one or more prerecorded data tracks on the magnetic recording layer to cause selective erasure of track segments on the film associated with the pseudo format film image frame as the film is advance to the next frame position. The absence of data in the track segments provides an indication on the film of a desired pseudo format which can be detected by the printer during the photofinishing process to reproduce the appropriate pseudo format print.

6 Claims, 3 Drawing Sheets

CAMERA APPARATUS WITH PSEUDO FORMAT FILM ENCODEMENT

CROSS REFERENCE TO RELATED APPLICATIONS

This application discloses subject matter related to the disclosures of U.S. patent application Ser. No. 708,964, entitled "Camera Apparatus with Pseudo-Format Film Encodement" filed concurrently herewith in the name of Paul Lee Taillie and U.S. patent application Ser. No. 708,960, entitled "Camera Apparatus For Pseudo-Format Film Encodement" filed concurrently herewith in the name of Jeffrey Richard Stoneham.

FIELD OF INVENTION

This invention relates to the field of camera apparatus adapted for film encodement to indicate the existence of pseudo telephoto and pseudo panoramic formats on specific image frames.

BACKGROUND OF INVENTION

A pseudo telephoto print is one that is made from a central portion of a film image frame that has the same width-to-length ratio, e.g. 1.0:1.5 (or 4"×6"), as that of the full sized frame. During the printing process, the peripheral margins of the film frame are masked and the central portion is enlarged to the desired size to give a print with an apparent telephoto or close-up format. The degree of telephoto effect is determined by the enlargement and masking employed at the printer.

A pseudo panoramic print is one in which the upper and lower margins of the image frame are masked, i.e. eliminated from the print, to provide a viewing area with a width-to-length ratio greater than 1:2 and preferably 1:3. During the printing process, the film image frame is masked as described and the image is enlarged to provide a full height print with the appearance of a panoramic or elongated format. Both pseudo tele and pseudo pan prints are thus accomplished by adjustment of the printer without the need for the use of a true telephoto lens in the camera.

The foregoing pseudo formats and exemplary camera apparatus for implementing them are described more fully in commonly assigned U.S. Pat. No. 3,490,844, and in U.S. Pat. No. 4,357,102- Taren et. al., respectively, the disclosures of which are incorporated herein by reference. Commonly assigned U.S. Pat. Re. No. 32,797 describes apparatus for optically encoding the film with indicia at the appropriate frames to indicate the existence of a particular pseudo format to enable automatic processing of the film in the printing process.

In commonly assigned U.S. Pat. No. 4,975,732, there is described photographic film technology embodying a layer of virtually transparent magnetic material coated on film on which information concerning film characteristics is recorded by the film manufacturer in a plurality of parallel tracks longitudinally disposed on the film. The information may be used by the camera to set picture-taking characteristics tailored to the specific film type in the camera. For this purpose, a magnetic read head would be embodied in the camera. Similarly, a magnetic read head would be included in the photofinishing printer to make use of such information during photofinishing processes to set certain operating characteristics of the printer.

As described in the '732 patent, such information is recorded as discrete, encoded data bits in a plurality of parallel data tracks. The tracks may contain real data concerning the film or, alternatively, dummy data bits may be recorded serially in certain of the tracks to establish the existence of the tracks. In a camera designed to make optimum use of the recorded film data a magnetic read head would be provided. Additionally, it would be expected that such a camera would be provided with the means, either via the same magnetic read head or a separate write head, to record data onto the film which could indicate the extent of film exposed in the camera as well as characteristics of the scene and of the camera settings involved in each exposure which are also useful in the photofinishing process. The disclosure of the '732 patent also contemplates that data recorded on the film by the camera magnetic head may include data indicating when pseudo telephoto or pseudo panoramic images are exposed in the camera at particular image frames. However, magnetic recording apparatus is a relatively expensive feature that would tend to be limited to more costly cameras and consequently would not be suitable for use in low cost cameras. It is therefore desirable that some relatively inexpensive means be provided in low cost cameras that would take advantage of the recording capability of the magnetically coated film to provide an indication of when pseudo telephoto and pseudo panoramic image frames exist on the film.

It is accordingly an object of the present invention to provide apparatus for indicating on film with a magnetic recording layer the existence of pseudo format image frames on the film.

It is a further object of the invention to provide apparatus of the type described that is simple and inexpensive and thus suitable for use in low cost cameras.

It is a still further object of the invention to provide camera apparatus for recording a pseudo format indication on film having a magnetic recording layer but that does not require the use of a relatively costly magnetic write head to write encoded data bits on the film.

SUMMARY OF INVENTION

In accordance with the invention, therefore, photographic camera apparatus is provided for encodement of the existence of pseudo format image exposures on film of the type having a layer of magnetic recording material thereon in which there is prerecorded data in at least one data track extending lengthwise along the film. To this end there is provided a selector means, such as a user accessible button on the camera, for establishing the existence of a particular pseudo format exposure on an image frame on the film. The apparatus of the invention further comprises magnetic erasing means responsive to the selector means for erasing the prerecorded data from a selected data track over a substantial portion of a segment of the selected track associated with the pseudo format image frame, the erased portion of the track segment being indicative of the particular pseudo format existing for the associated image frame. In a preferred form of the invention, the film includes a plurality of parallel prerecorded data tracks and the erasing means is comprised of independently movable permanent magnets adapted to be selectively urged into data erasing contact with selected ones of the data tracks to indicate by the selection of the data tracks for erasure the particular pseudo format existing for the associated image frame from a plurality of available formats.

DETAILED DESCRIPTION

Figure 1:
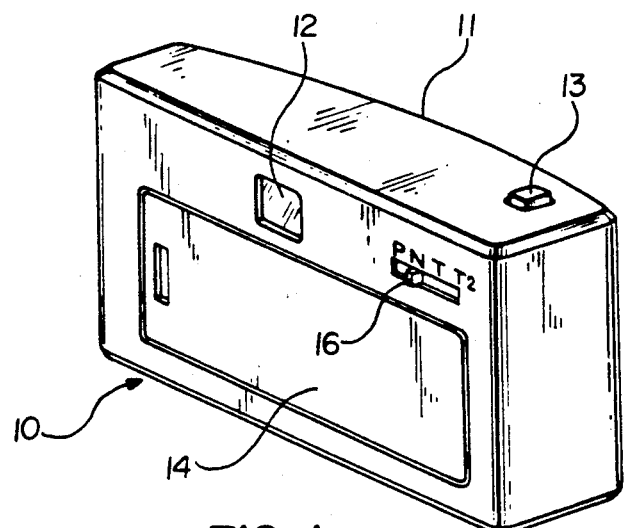
FIG. 1 is a perspective rear view of a camera illustrating a pseudo format selection button used in the apparatus of the invention.
Figure 2:
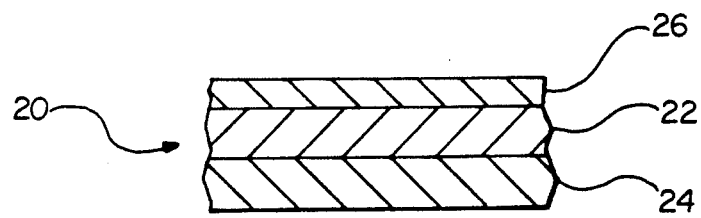
FIG. 2 is a schematic side cross sectional view of film having a magnetic recording layer with which the present invention is adapted to be used.
Figure 3:
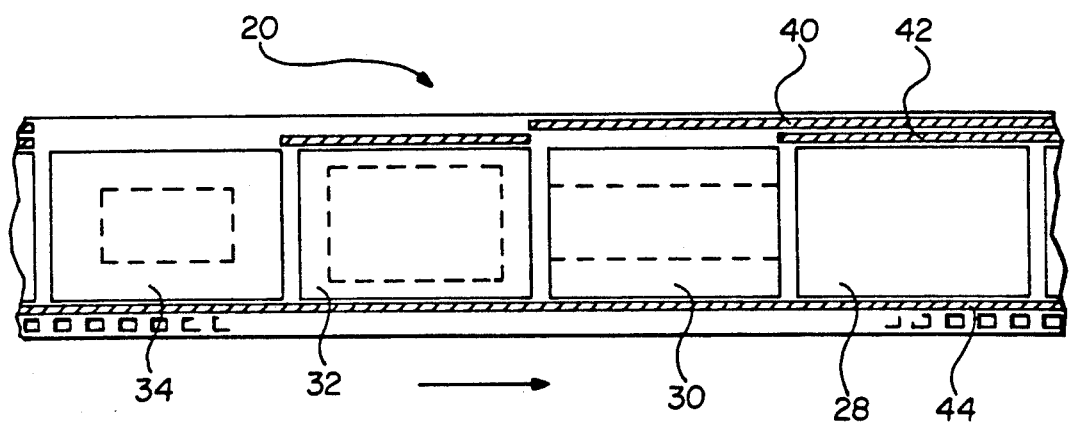
FIG. 3 is a diagrammatic illustration of a film strip illustrating various pseudo formats.

In FIG. 1, there is shown a camera 10 conventionally comprised of a body 11, view finder 12, shutter release button 13 and rear film access door 13. Camera 10 preferably is adapted to receive and utilize photographic film of the type schematically illustrated in FIG. 2 where there is shown a cross section of film 20 having a base layer 22 with a photographic emulsion layer 24 on one side and a layer of magnetic recording material 26 on the other side. In FIG. 3, a strip of film 20 is shown with normal image frames illustrated in solid lines and with portions thereof used for pseudo format prints being shown in dotted outline. Thus frame 28 represents a normal negative image frame that will be reproduced at normal aspect ratio and without image magnification beyond that employed in making a normal print. Image frame 30 shows, in dotted outline, a modified aspect ratio of the frame which will be employed at the printer in making a pseudo panoramic ("pseudo pan") print by masking the upper and lower portions of the negative image and adjusting the magnification to make the short side of the resulting print substantially the same as the width of the print paper.

In image frame 32 the dotted outline shows the central portion of the negative image that will be magnified at the printer to create a pseudo telephoto ("pseudo tele") print with, for example, a 1.4×normal magnification while the smaller dotted outline area within negative image frame 34 shows a pseudo tele frame that will receive a greater magnification of, for example, 2×normal.

Recorded in the magnetic layer 26 of the film is at least one, and preferably a plurality of magnetic tracks 40, 42 and 44. Tracks 40 and 42 are preferably prerecorded by the film manufacturer to indicate certain film characteristics as previously described. Track 44 illustrates how an additional data track might be recorded between the image frame areas and the film drive/metering perforations 46 by a type of camera having a built-in magnetic recording head to record picture taking characteristics for each frame, such as aperture size and shutter speed, flash or no flash, etc.. This track is shown for illustrative purposes only, since in a low cost camera for which the present invention is intended it is not likely that a magnetic recording head would be included.

Figure 5:
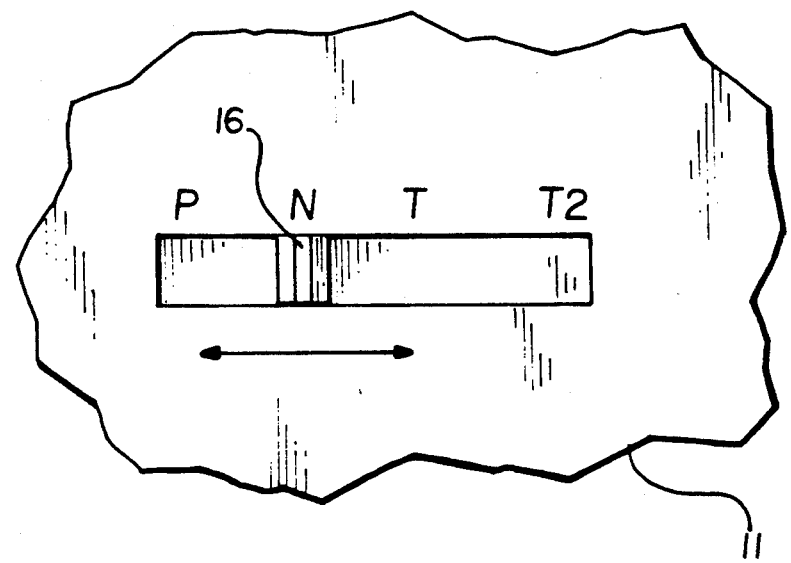
FIG. 5 is a cutaway segment of a portion of the camera of FIG. 1.

Referring again to FIG. 1, according to a particular feature of the invention, a pseudo format slide selector button 16 is provided to enable the camera user to establish the existence of a particular pseudo format image on the film 20 by magnetic encodement of the magnetic layer 26 on the film. As best seen in FIG. 5, selector button 16 is shown as having three positions: a central position "N" corresponding to a normal, unmodified image format, a leftward position "P" corresponding to a pseudo pan format and two rightward positions, "T" and "T2", corresponding to pseudo tele formats of 1.4× and 2×magnification.

Figure 4:
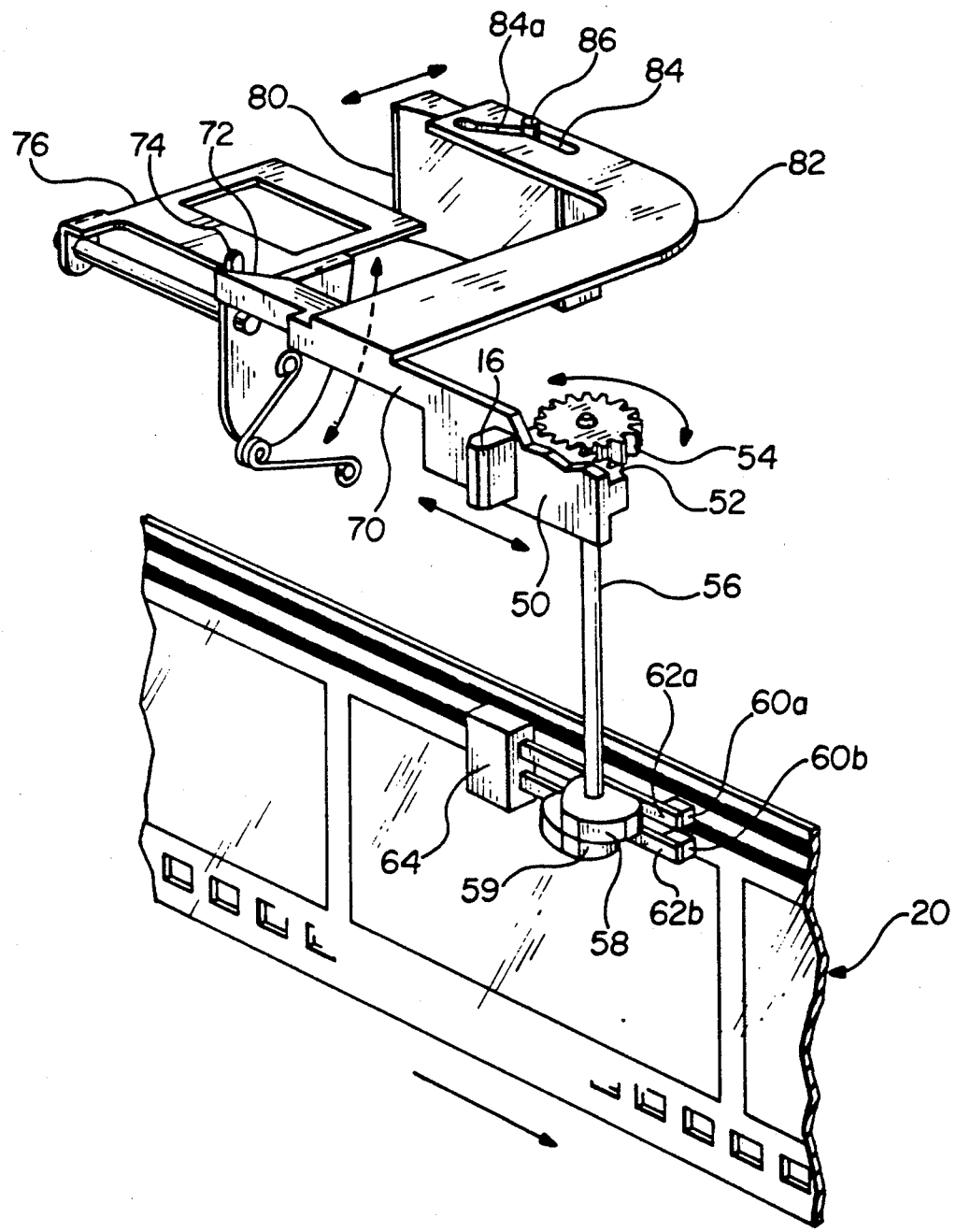
FIG. 4 is a perspective view of apparatus internal to the camera of FIG. 1 and which embodies the invention.
Figure 6:
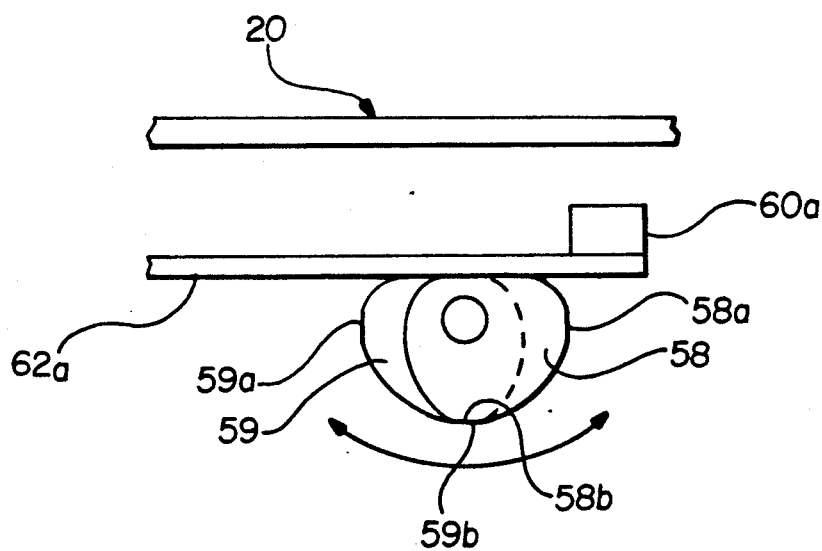
FIG. 6 is a detail showing of a portion of the apparatus of FIG. 4.

Referring now to FIG. 4, selector button 16 is integrally formed on one side of a slide bar 50, the other side of which is formed as a rack gear 52 in engagement with pinion gear 54. Pinion 54 is secured to one end of drive rod 56, the other end of which has mounted thereon a pair eccentric cams 58 and 59 with their camming surfaces riding on the back sides of flexure springs 62a and 62b, respectively. Each flexure spring 62a and 62b has mounted on its front side, i.e. the side facing the magnetic recording surface of the film a small permanent magnetic 60a and 60b, respectively, while the other ends of the flexure springs are fixedly mounted in a block 64 secured internally to the camera body (not shown). The physical arrangement of the magnets is such as to be in alignment with prerecorded tracks 40 and 42 in the magnetic recording layer of film 20. As shown in FIG. 6, when the selector button is in its normal position, the restoring force of flexure springs 40, 42 holds magnets 60a, 60b away from the magnetic layer. The spacing is such relative to the strength of the magnets that the magnetic field from the magnets has no effect on the prerecorded tracks on the film. When it is desired to expose a pseudo pan image frame on the film, the user moves the selector to the "P" position. This rotates the cams on the end of drive rod 56 in the clockwise direction, as seen in FIG. 6, causing the eccentric cam surface 59a of the lower cam 59 to selectively urge flexure spring 62b toward the magnetic surface of the film to bring magnet 60b into contact with prerecorded track 42. After the picture is taken, the film is advanced to the next available image frame position and, while this happens, the field from magnet 60b effectively erases the segment of track 42 adjacent to the Pseudo pan image frame 30 (FIG. 3). It will be appreciated that the field strength of the magnets must be sufficient so that, when in contact with or substantially close to the magnetic layer, the field of the magnets will exceed the coercivity of the film magnetic layer in order to effectively erase the recorded data in the track or tracks involved.

In a similar manner, sliding selector button 16 to the right to position "T" rotates the cams counterclockwise such that cam surface 58a of upper cam 58 urges magnet 60a against prerecorded track 40 causing the segment of track 40 adjacent to image frame 32 to be erased when the film is advanced to the next image frame position. By providing both cams 58 and 59 with a common eccentric surface 58b and 59b, respectively, a third pseudo format selector position is available, e.g. "T2", in which both magnets are urged against their respective tracks thereby erasing both track segments when the film is advanced, as shown in FIG. 3 adjacent negative image frame 34. Thus, by simple means that does not require a costly record head and related data recording circuitry or power source, a pseudo encodement of the film is accomplished in which the absence of prerecorded information on selected track locations is indicative of a particular selection of a pseudo format selection by the camera user for that particular image frame. This absence of prerecorded information in the selected track is readily sensed by photofinishing equipment normally equipped to read magnetically encoded data bits on the film to cause the appropriate pseudo format print to be reproduced with suitable magnification and, in the case of a pan print, with suitable selection of aspect ratio.

In FIG. 4, apparatus actuated by the movement of selector button 16 may be included within the view finder compartment of the camera to make it convenient for the user to visually frame the image scene for the appropriate pseudo pan or tele selection during the picture taking process. To this end, slide bar 50 is provided with an extension 70 which terminates in a ramped cam surface 72. A follower tab 74 formed on a downwardly rotatable pseudo pan viewing mask 76 engages cam surface 72 to cause the mask to be rotated down into the field of view when selector button 16 is moved to position "P". A restoring spring 78 returns the mask to the upper position out of the field of view when selector button is returned to the normal position "N".

For pseudo tele pictures, a lens 80 is axially translated within the view finder compartment to provided a zoom effect to the user while framing the image to be taken. Lens 80 is translated by means of L-shaped arm 82 attached at one end to slide bar extension arm 70. Arm 82 is provided at the distal end with a cam slot 84 which engages a follower pin 86 secured to the lens 80. For two position tele selection, the ramped cam segment 84a of cam slot 84 is made long enough to accommodate the necessary travel of the lens within the view finder compartment.

Although multiple parallel tracks are illustrated, it will be appreciated that a single track/magnet combination may be used to provide for selection of a single format option. Similarly, provision of three or more track/magnet combinations can be used to increase the format options. The invention has been described in detail with particular reference to a presently preferred embodiment, but it will be understood that variations and modifications can be effected within the spirit and scope of the invention.

What is claimed is:

1. Photographic camera apparatus for providing encodement of the existence pseudo format image exposures on film of the type having a layer of magnetic recording material thereon in which there is prerecorded data in at least one data track extending lengthwise along the film, the apparatus comprising:

selector means for establishing the existence of a particular pseudo format for an image frame on the film;

magnetic erasing means responsive to the selector means for erasing said prerecorded data from at least one selected data track over a substantial portion of a segment of the track associated with said pseudo format image frame, said erased segment portion of the selected track being indicative of the particular pseudo format existing for the associated image frame.

2. The camera apparatus of claim 1 in which the erasing means comprises at least one permanent magnet mounted on a movable support and normally spaced away from said magnetic layer in a nonerasing position and further comprises biasing means responsive to the selector means upon establishment of a pseudo format to urge the magnet into an erasing position in alignment with a selected data track to be erased which indicates the established pseudo format for the associated image frame.

3. The camera apparatus of claim 1 wherein the film has a plurality of parallel prerecorded tracks and in which the erasing means is comprised of independently movable permanent magnets adapted to be selectively urged into erasing contact with selected one or more of said prerecorded data tracks to cause data erasure in the corresponding track or tracks, the erased track or tracks being indicative of the pseudo format for the image frame associated therewith.

4. The camera apparatus of claim 3 further comprising biasing means actuatable in response to selection of a pseudo format image exposure by said selector means to urge selected ones of the magnets onto selected ones of the data tracks to be erased, whereby said erased tracks are indicative of the selected pseudo format for the associated image frame.

5. The camera apparatus of claim 3 wherein said magnets contact said selected tracks during advance of said film from the pseudo format exposed frame to the next available image frame location.

6. The camera apparatus of claim 3 wherein said magnets are positioned to contact said tracks adjacent the image frame and are positioned to selectively erase the data tracks when the film is advanced to the next available image frame location after taking of the pseudo format image exposure.

* * * * *